D. H. HENDERSHOT.
SHAFT COUPLING.
APPLICATION FILED FEB. 29, 1912.
1,043,229.
Patented Nov. 5, 1912.
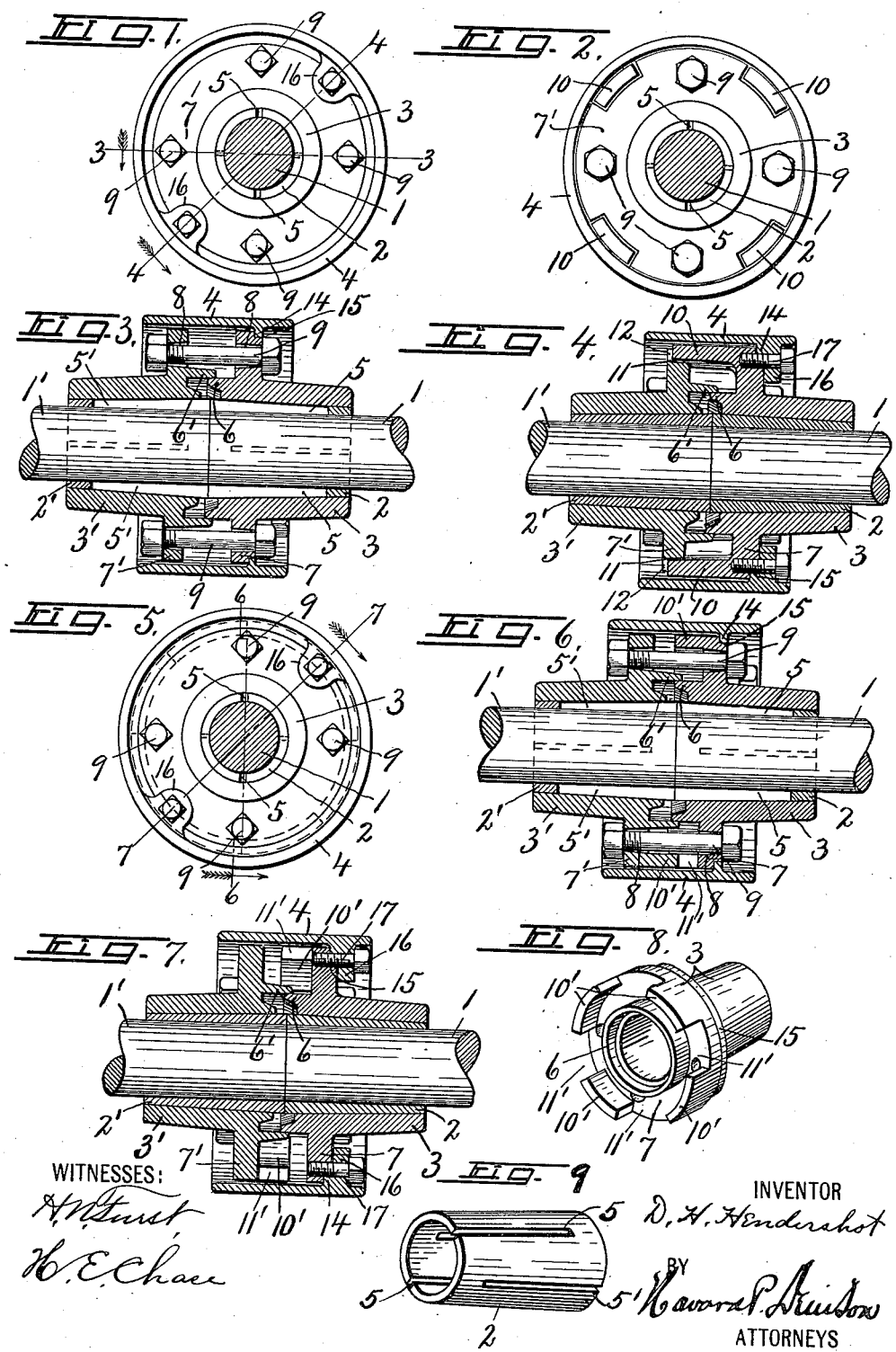
WITNESSES:
INVENTOR
D. H. Hendershot
ATTORNEYS

UNITED STATES PATENT OFFICE.

DANIEL H. HENDERSHOT, OF BALDWINSVILLE, NEW YORK.

SHAFT-COUPLING.

1,043,229.

Specification of Letters Patent.

Patented Nov. 5, 1912.

Application filed February 29, 1912. Serial No. 680,703.

*To all whom it may concern:*

Be it known that I, DANIEL H. HENDERSHOT, of Baldwinsville, in the county of Onondaga, in the State of New York, have invented new and useful Improvements in Shaft-Couplings, of which the following, taken in connection with the accompanying drawings, is a full, clear, and exact description.

This invention relates to certain improvements in shaft couplings of the class set forth in my Patent Number 807,926, December 19, 1905, involving the use of oppositely tapered split bushings, fitted upon the adjacent ends of the shaft sections, for receiving opposite internally tapered sleeves which are drawn together by suitable clamping bolts and are provided with interlocking members for preventing shearing strains upon the bolts, and causing both sleeves to rotate as a unit.

The primary object of the oppositely-tapering split bushings and their coacting tightening sleeves, together with the means for drawing the sleeves upon the tapering bushings, is to bring all points of the split sleeves into gripping engagement with the shaft sections throughout their lengths, while the main object of the interlocking connections between the sleeve sections is to prevent relative rotary movement of either of said sections and to thereby relieve the clamping bolts from the shearing strains, and at the same time to guide the sections in their axial movement and to more effectively maintain them in parallelism. These interlocking connections between the sleeve sections have been found to be particularly advantageous in this class of couplings in that they reduce the liability of breakage and also prevent in a large measure twisting or torsional binding of the sleeves upon the conical bushings, thereby permitting the couplings to be disconnected and moved along the shaft with greater facility than has heretofore been practiced, even after they have been in continuous use for a considerable period of time.

I have discovered however that it is possible to obtain still better results in the gripping power of and ability to release the coupling sections by locating the interlocking members beyond the circle in which the clamping bolts are placed, and that by so doing the interlocking members may be much lighter than when arranged near the axis of the shaft, and one of the additional objects of my present invention is to provide the meeting ends of the sleeves with interlocking members of relatively small radial depth but relatively large circumferential width, located beyond the circle in which the clamping bolts are placed.

Another object is to arrange the interfitting tongues and grooves or recesses symmetrically and of uniform circumferential width, so that the tongues of one section may fit into either of the grooves or recesses of the other section, thereby permitting the sections to be registered and interlocked under slight turning movement of one section relatively to the other.

Another object is to provide one of the sleeves only with a circular guard or shield extending axially beyond the opposite ends of the clamping bolts, to reduce to a minimum the liability of danger from portions of the garments of operatives or others becoming caught by the bolts or nuts.

Other objects and uses will be brought out in the following description.

In the drawings—Figures 1 and 2 are respectively opposite end views of my improved shaft coupling, showing the shaft in section. Figs. 3 and 4 are lengthwise sectional views of the same coupling taken respectively on lines 3—3 and 4—4, Fig. 1. Fig. 5 is an end view of a similar coupling, showing a slightly modified form of interlocking members on the sleeves. Figs. 6 and 7 are lengthwise sectional views of the same coupling, taken respectively on lines 6—6 and 7—7, Fig. 5. Fig. 8 is a perspective view of one of the coupling sleeves shown in Figs. 5, 6 and 7. Fig. 9 is a perspective view of one of the detached tapering bushings.

In illustrating the operation of my invention, I have shown a pair of coaxial shaft sections —1— and —1'— of the same diameter and arranged end to end, and upon which are snugly fitted oppositely tapering metal sleeves —2— and —2'— for receiving opposed clamping sleeves —3— and —3'—, having internal oppositely tapering bores fitting closely upon the peripheries of the tapering bushings —2— and —2'—, said sleeves being surrounded by a circular guard or shield —4—.

As shown more clearly in Figs. 3, 6 and 9, the bushings —2— are provided in this instance with diametrically opposite pairs of slits or slots —5— and —5'— arranged equally distant apart circumferentially, the slits —5— extending from one end, as the small end of the bushing, to a point in proximity to but terminating short of the opposite end, while the slits —5'— extend from the end face of the larger end of the bushing to a point in proximity to but terminating short of the small end, thereby forming a series of jaws which are more or less yielding at all points throughout the length of the bushing. That is, these jaws are not only compressible at the ends of the bushing, but the portions thereof between the slits and particularly at the edges are also compressible upon the shaft, thereby causing said bushing to grip the shaft at all points throughout its length and practically throughout its circumference.

As previously intimated, the sleeves —3— and —3'— are provided with oppositely tapering bores corresponding to the taper of the respective bushings —2— and —2'— along which they are movable to compress the split bushings upon their respective shaft sections, and are also provided on their meeting ends with telescoping annular flanges —6— and —6'—, closely fitting with an easy sliding fit one upon the other as the sleeves are drawn together, so as to additionally brace the shaft and bushing sections against relative radial movement. The portions of these bushings just outside of the telescoping flanges —6— and —6'— are provided with radially projecting circular flanges —7— and —7'— of substantially the same diameter and spaced some distance apart when the sleeves are tightened upon the bushings. These flanges —7— and —7'— are provided with a plurality of, in this instance four, bolt openings —8—, spaced equally distant apart circumferentially just outside of the telescoping flanges —6— and —6'— for receiving a corresponding number of clamping bolts —9—, the latter being provided with suitable heads and nuts for engaging the end faces of said flanges —7— and —7'— for drawing the sleeves —3— and —3'— along and upon the tapering portions of the bushings —2— and —2'— to compress the latter upon the shaft, thereby firmly coupling the shaft sections together.

In Figs. 1, 2, 3 and 4, the flange —7— is provided with a series of, in this instance four, axially or laterally projecting tongues or lugs —10— of substantially the same length and circumferential width and spaced uniform distances apart for interfitting or interlocking engagement in suitable recesses —11— in the periphery of the opposite flange —7'— as shown more clearly in Fig. 4; that is, the recesses —11— are of substantially the same circumferential width as that of the adjacent ends of the tongues —10— which they are adapted to receive, thereby forming a series of shoulders —12— adapted to be engaged by said tongues, whereby the sleeve sections —3— and —3'— are locked against relative circumferential movement. These laterally projecting tongues —10— and corresponding grooves —11— are of relatively small depth radially, and are located beyond the circle in which the clamping bolts —9— are arranged, so as to afford a greater degree of resistance against relative turning movement of the sleeves than would be the case if these interlocking members were located nearer the axis of the shaft. Another advantage of these interlocking members is that it relieves the shearing strain upon the bolts and tends to brace the sleeves against twisting or torsional binding upon the bushings, which enables them to be more easily removed when it is desired to uncouple the shaft sections. These interlocking sections may be slightly modified however, without departing from the spirit of this invention, and in Figs. 5, 6, 7 and 8 I have shown the meeting ends of the sleeves as both provided with a series of, in this instance four, axially projecting tongues or lugs —10'— and corresponding grooves or recesses —11'—, the tongues and grooves on both sleeves being of substantially the same circumferential widths and spaced uniform distances apart so that the tongues of one section may fit readily into either of the grooves of the other section, thereby locking the two sections against relative rotary movement.

The guard or shield —4— preferably consists of a circular band of sufficient face width to cover the peripheries of the flanges —7— and —7'— and heads and nuts of the bolts —9— to prevent the latter from catching on to external objects, said guard or shield being provided near one end with an inwardly projecting flange —14—, milled so as to fit snugly in an annular recess —15— in the outer end face of the flange —7—, said flange —14— being provided with diametrically opposite inwardly projecting ears or lugs —16— having apertures which register with threaded openings in the flange —7— or receiving suitable clamping bolts 17 as shown more clearly in Figs. 4 and 7. This guard or shield —4— is therefore supported wholly upon the flange —7— of the sleeve —3— and extends loosely across the intervening space between the flanges —7— and —7'— and over the periphery of the flange —7'— and adjacent nuts of the bolts —9— for the purpose described.

What I claim is:—

In a shaft coupling, in combination with coaxial shaft sections arranged end to end, oppositely-tapering split bushings fitted upon the shaft sections, opposite sleeves movable lengthwise of and upon the tapering bushings and provided with telescoping annular flanges and with enlarged annular flanges extending radially beyond the first named flanges, said additional flanges having axially-extending interlocking members spaced some distance apart from the first named annular flanges, and clamping bolts passed through said additional annular flanges between the first named annular flanges and locking members, and a circular guard secured to one of the additional flanges and surrounding both of said additional flanges and extending axially beyond the ends of the bolts.

In witness whereof I have hereunto set my hand on this 21st day of February 1912.

DANIEL H. HENDERSHOT.

Witnesses:
H. E. CHASE,
F. B. CALCUTT.

Copies of this patent may be obtained for five cents each, by addressing the "Commissioner of Patents, Washington, D. C."